(12) United States Patent
Aufrere et al.

(10) Patent No.: US 6,361,115 B1
(45) Date of Patent: Mar. 26, 2002

(54) VEHICLE SEAT WITH ANCHORING WIRE TO SECURE AN ELEMENT ONTO THIS SEAT

(75) Inventors: Christophe Aufrere, Marcoussis; Joël Canteleux, Gallardon, both of (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/490,510

(22) Filed: Jan. 25, 2000

(30) Foreign Application Priority Data

Feb. 3, 1999 (FR) .............................. 99 01228

(51) Int. Cl.$^7$ ................................................ A47C 7/02
(52) U.S. Cl. .............................. 297/452.18; 297/216.11; 297/256.16
(58) Field of Search .................... 297/452.18, 250.1, 297/130, 256.16, 216.11

(56) References Cited

U.S. PATENT DOCUMENTS

| | | | | |
|---|---|---|---|---|
| 4,850,644 A | * | 7/1989 | Kazaoka et al. | .... 297/452.18 X |
| 5,383,708 A | | 1/1995 | Kaisha | |
| 5,509,716 A | * | 4/1996 | Kolena et al. | ...... 297/452.18 X |
| 5,626,395 A | * | 5/1997 | Aufrere | .................. 297/452.18 |
| 5,918,934 A | * | 3/1999 | Siegrist | .............. 297/216.11 X |
| 5,941,601 A | * | 8/1999 | Scott et al. | ........... 297/250.1 X |
| 6,030,046 A | * | 2/2000 | Dorow | .................... 297/253 X |
| 6,183,044 B1 | * | 2/2001 | Koyanagi et al. | ........ 297/253 X |

FOREIGN PATENT DOCUMENTS

| | | |
|---|---|---|
| DE | 196 50087 c | 12/1997 |
| DE | 198 067 838 | 1/1999 |
| EP | 0 560 184 A | 9/1993 |
| EP | 0 694 436 A | 1/1996 |
| EP | 0 858 928 A | 8/1998 |

* cited by examiner

Primary Examiner—Peter M. Cuomo
Assistant Examiner—Stephen Vu
(74) Attorney, Agent, or Firm—Marshall, Gerstein & Borun

(57) ABSTRACT

A seat for a motor vehicle has a seat with two side flanges mutually joined by a transverse tube. An anchoring wire for securing an element designed to be placed on the seat is joined at two ends to a flap extending in the vicinity of the transverse tube. Extending between the two ends is an open loop and a fixing section. The anchoring wire is deformable under the action of a strong force exerted on the fixing section, causing the loop to contract around the tube and transmit the force to the tube.

12 Claims, 4 Drawing Sheets

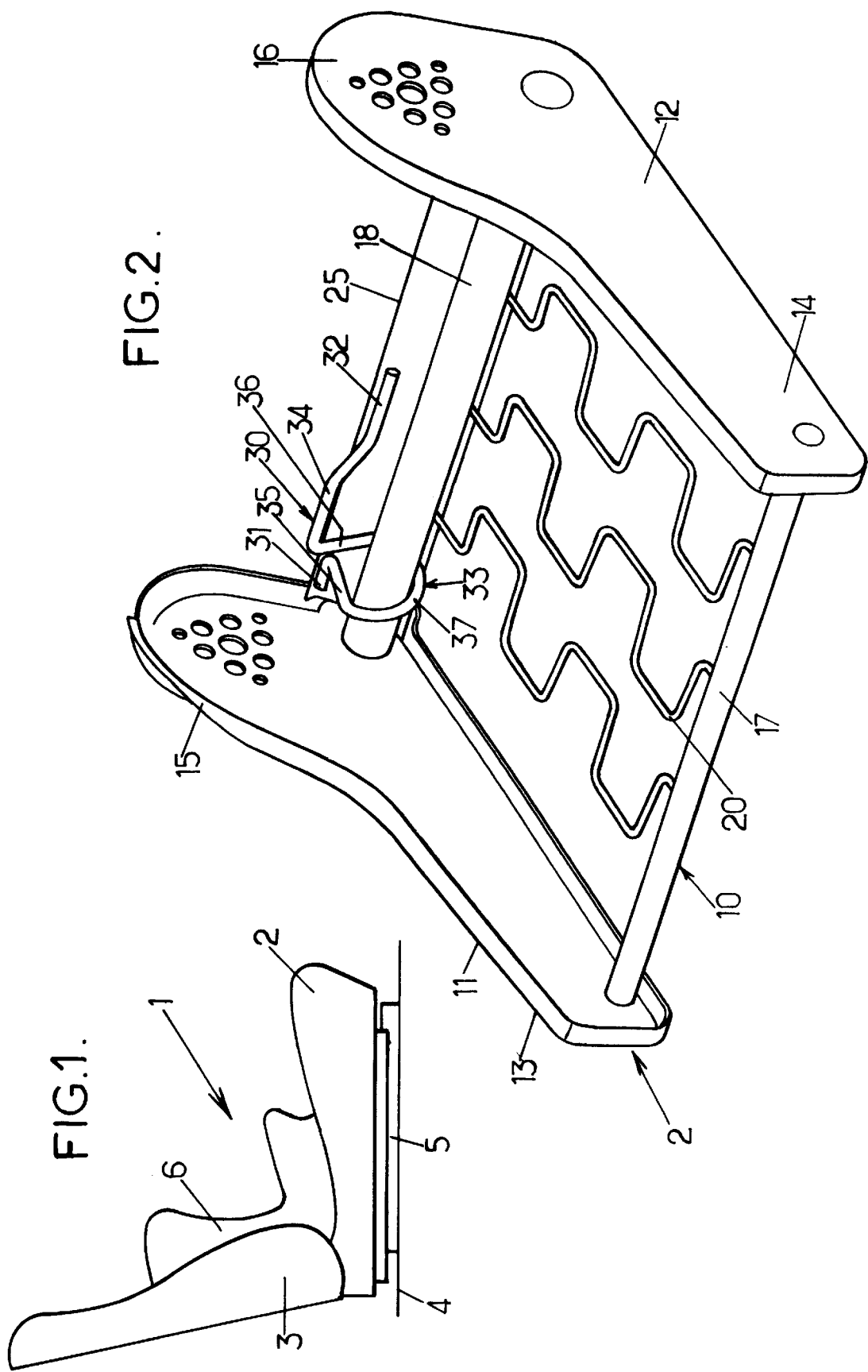

VEHICLE SEAT WITH ANCHORING WIRE TO SECURE AN ELEMENT ONTO THIS SEAT

FIELD OF THE INVENTION

The present invention relates to a seat for a motor vehicle and in particular a seat for an adult designed so that an element such as a child seat can be placed and secured on it.

BACKGROUND OF THE INVENTION

The seats commonly encountered consist of a seat and a backrest mounted above the seat, the seat having a seating structure comprising:

two side flanges, each having a front part arranged at a distance from the backrest and a rear part close to the backrest and at least one transverse tube joining the rear parts of the side flanges.

OBJECTS AND SUMMARY OF THE INVENTION

The objective of this invention is to provide a seat having means to allow an element placed in this seat to be locked in position in a secure manner, specifically in order to withstand impact in the event of an accident.

To this end, the invention proposes a seat of the type mentioned above which has at least one anchoring wire designed to secure an element to be placed on the seat, where it is retained, the wire essentially being rigid and comprising a first and a second end between which extend, firstly, a first loop disposed around said transverse tube and, secondly, a fixing section adapted for fixing said element, said fixing section being located between said first loop and said second end of the anchoring wire, and in that the first and second ends of the anchoring wire are joined to the seating structure so as to remain immobile relative to the transverse tube, the anchoring wire is adapted to be deformed, under the action of a force exerted by the element on the fixing section of the anchoring wire, for causing the first loop to contract around the tube and transmit the force to the tube. the anchoring wire being deformable under the action of a force exerted by the element on the fixing section of the anchoring wire that is great enough to cause the loop to contract around the tube and transmit the force to the tube.

As a result, a child seat can be readily locked in position on an adult seat fitted with an anchoring wire of this type. In the event of impact, the loop of this wire contracts around a resistant structural element of the adult seat so that the child seat is firmly retained. This safety feature is obtained without making the structure of the adult seat more complex.

The seat for a motor vehicle proposed by the invention may optionally incorporate one or more of the following features in addition:

said at least one loop is of a diameter greater than that of the transverse tube;

the first and second ends of the wire extend in opposite directions, each towards a side flange;

the fixing section extends parallel with the transverse tube;

said first loop comprises a first and a second straight leg which are mutually perpendicular and joined to one another by a curved section substantially arcuate, the first leg being integral with the first end of the anchoring wire and the second leg being integral with the fixing section;

a crossmember adjacent to the transverse tube extends transversely between the side flanges, the first and second ends of the anchoring wire being joined to said crossmember, substantially perpendicularly to a plane formed by said first loop;

the anchoring wire has a second loop passing around the transverse tube which has a first and a second leg joined respectively to the second end of the anchoring wire and the fixing section, the second legs of the first and second loops forming a U shape in conjunction with the fixing section;

the first legs of the first and second loops are arranged inside the U shape;

the first legs of the first and second loops are arranged outside the U shape;

two anchoring wires are placed on the rear transverse tube;

the two anchoring wires are reciprocally joined to one another and the transverse tube is mounted rotatable relative to the two side flanges, and said first loop is adapted for contracting and braking the rotation of the transverse tube, when a sufficiently high force is applied to the fixing section of the anchoring wire.

BRIEF DESCRIPTION OF THE DRAWINGS

Four examples of embodiments of the invention will now be described with reference to the appended drawings, of which:

FIG. 1 is a schematic side view of a seat for a motor vehicle as proposed by the invention, on which a child seat is locked;

FIG. 2 is a schematic view in perspective of the structure of the seat-part of the seat illustrated in FIG. 1, fitted with a first embodiment of an anchoring wire as proposed by the invention.

MORE DETAILED DESCRIPTION

Figure 3:
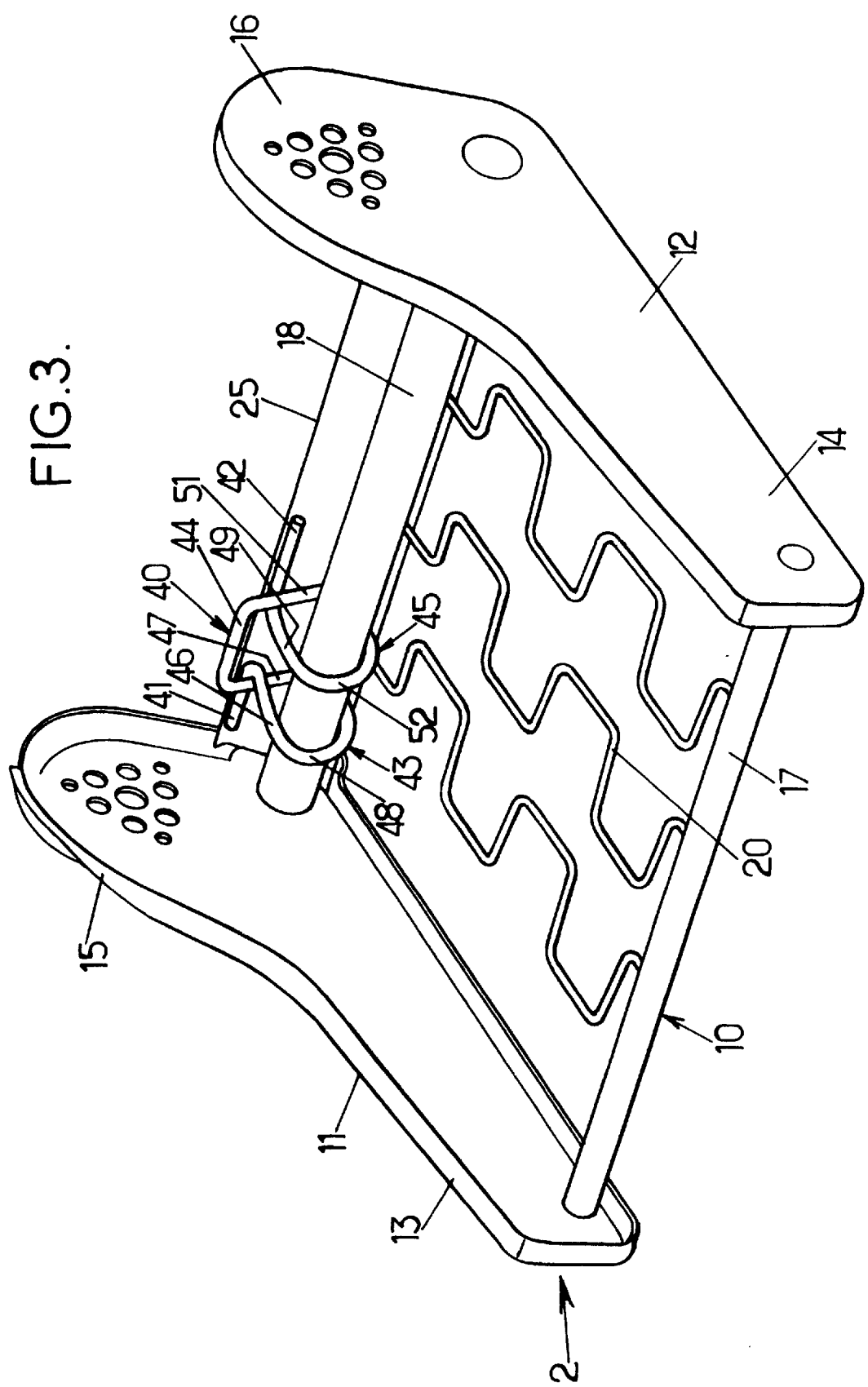
FIGS. 3 to 5 are perspective views of the seat-part of the seat illustrated in FIG. 1 fitted with second, third and fourth embodiments of an anchoring wire as proposed by the invention.

A seat 1 for a motor vehicle is illustrated in FIG. 1. In a manner known per se, this adult seat comprises a seat 2 and a backrest 3. The seat 2 is slidably mounted on a floor 4 of the motor vehicle, for example, by means of slides 5. The backrest 3 is mounted so that it can rotate on the seat 2. An element 6 such as a child seat is immobilized against the seat 2 and the backrest 3 of the adult seat 1.

The seat 2 has a seating structure 10 illustrated in perspective in FIG. 2. This seating structure 10 consists of two side flanges 11, 12 which extend longitudinally relative to the direction of the vehicle, each having a front part 13, 14 spaced apart from the backrest 3 and a rear part 15, 16 close to this back rest and on which the backrest 3 is rotatably mounted. The two side flanges 11, 12 are reciprocally joined at the front part by a front transverse tube 17 and at the rear part by a rear transverse tube 18. The two transverse tube 17, 18 are resistant structural elements capable of withstanding impact in the event of the vehicle being involved in an accident so as to minimize deformation of the seat 1.

As usual, the seat 2 is upholstered with foam (not illustrated in the drawings) designed to ensure the comfort of an occupant of the seat. This upholstery is elastically supported by means of a suspension layer 20 extending longitudinally between the front parts 13, 14 and the rear parts 15, 16 of the seat. At the rear part, the suspension layer is joined to a flap 25 which extends transversely between the two flanges 11, 12 parallel with the rear transverse tube 18 and in the vicinity thereof. The flap 25 is provided in the form of a rectangular plate slightly inclined relative to the vertical, the width of which is substantially greater than the diameter of the rear transverse tube 18. Consequently, the plate 25 extends beyond the transverse tube 18 at either end and the suspension layer 20 is fixed to the bottom part of the plate so that it extends underneath the transverse tube 18.

In order to provide a positive lock for the child seat 6 on the seat-part 2 of the adult seat 2, two anchoring wires 30 are placed around the rear transverse tube 18. In the case of the first embodiment illustrated in FIG. 2, a single anchoring wire 30 only is visible.

The anchoring wire 30 is shorter than the width of the seat 1 and has a first end 31 and a second end 32 between which an open loop 33 and a fixing section 34 extend one after the other.

The first end 31, the second end 32 and the fixing section 34 are straight sections extending parallel with the rear transverse tube 18. The first end 31 extends in a direction towards the side flange 11 and the second end 32 extends in the opposite direction, towards the second side flange 12. These two ends are fixed to the top part of the flap 25 so that they are immobile relative to the rear transverse tube 18 and the fixing section 32 is located at a higher level than that of the two ends 31, 32.

The open loop 33 extends around the rear transverse tube 18, the plane of this loop being perpendicular to the axis of the tube 18. The loop consists of first and second straight legs 35, 36, which are reciprocally joined by a curved, arcuate-shaped section 37.

The first leg 35 is integral with the first end 31 and the second leg 36 is integral with the fixing section 34, relative to which they are respectively perpendicular. The radius of the curved section 37 is slightly greater than the radius of the rear transverse tube 18.

The anchoring wire 30 is rigid and is made from a metal material, for example. It is either shaped before the seat is assembled, in which case the tube 18 is inserted through the loop 33 before being joined to the side flanges 11, 12, or it is shaped after the seat has been assembled. The ends 31 and 32 are welded to the flap 25 so that the first and second legs 35, 36 are substantially horizontal and vertical respectively.

The child seat 6 is hooked onto the fixing section 34, for example. In the event of a violent impact, a traction force is exerted on the fixing section 34, which causes the open loop 33 to contract around the rear tube 18 whilst the ends 31 and 32 remain immobile. If the traction force is very high, the loop 33 contracts so that the curved section 37 moves into abutment against the tube 18 so that the forces are transmitted to this tube. This means that very little strain is placed on the weld joints of the ends 31 and 32 and the child seat 6 is effectively retained in the seat 1.

The second embodiment of the anchoring wire 40 illustrated in FIG. 3 differs from the first embodiment in terms of the number of open loops. The seating structure 10 is identical and the same reference numerals are retained to denote the same constituent parts.

The anchoring wire 40 has two ends 41, 42 in opposite directions, between which a first open loop 43, a fixing section 44 and a second open loop 45 extend one after the other. As above, the first end 41 extends in a direction towards the first side flange 11 and the second end 42 extends in a direction towards the second side flange 12, these two ends being respectively welded to the top part of the flap 25. The first and second ends 41, 42 as well as the fixing section 44 are straight and extend transversely to the seat, the fixing section 44 being located above the two ends.

The first loop 43 has a first leg 46 integral with the first end 41 and a second leg 47 integral with the fixing section 44. Extending between these two legs is a curved section 48 of an arcuate shape, the radius of which is slightly greater than that of the tube 18.

Similarly, the second open loop 45 has a first leg 49 integral with the second end 42 and a second leg 51 integral with the fixing section 44. Extending between these two legs is a curved section 52 identical to the curved section 48 of the first open loop 43. The second legs 47 and 51 of the first and second loops 43, 45 are substantially vertical, extending downwards so as to form a "U" in conjunction with the fixing section 44. The first legs 46 and 49 are substantially horizontal so that they are perpendicular to the second legs 47, 51. The plane of the loops 43 and 45 is perpendicular to the axis of the transverse tube 18. In this second embodiment, the first legs 46 and 49 of the first and second open loops 43, 45 extend inside the "U" shape.

The anchoring wire 40 is shaped first and then threaded onto the rear tube 18 before the latter is joined to the side flanges 11 and 12.

The child seat is hooked onto the fixing section 44 and, in the event of impact, the traction exerted on this section causes the two loops 43 and 45 to contract so that the force is picked up by the transverse tube 18.

Figure 4:
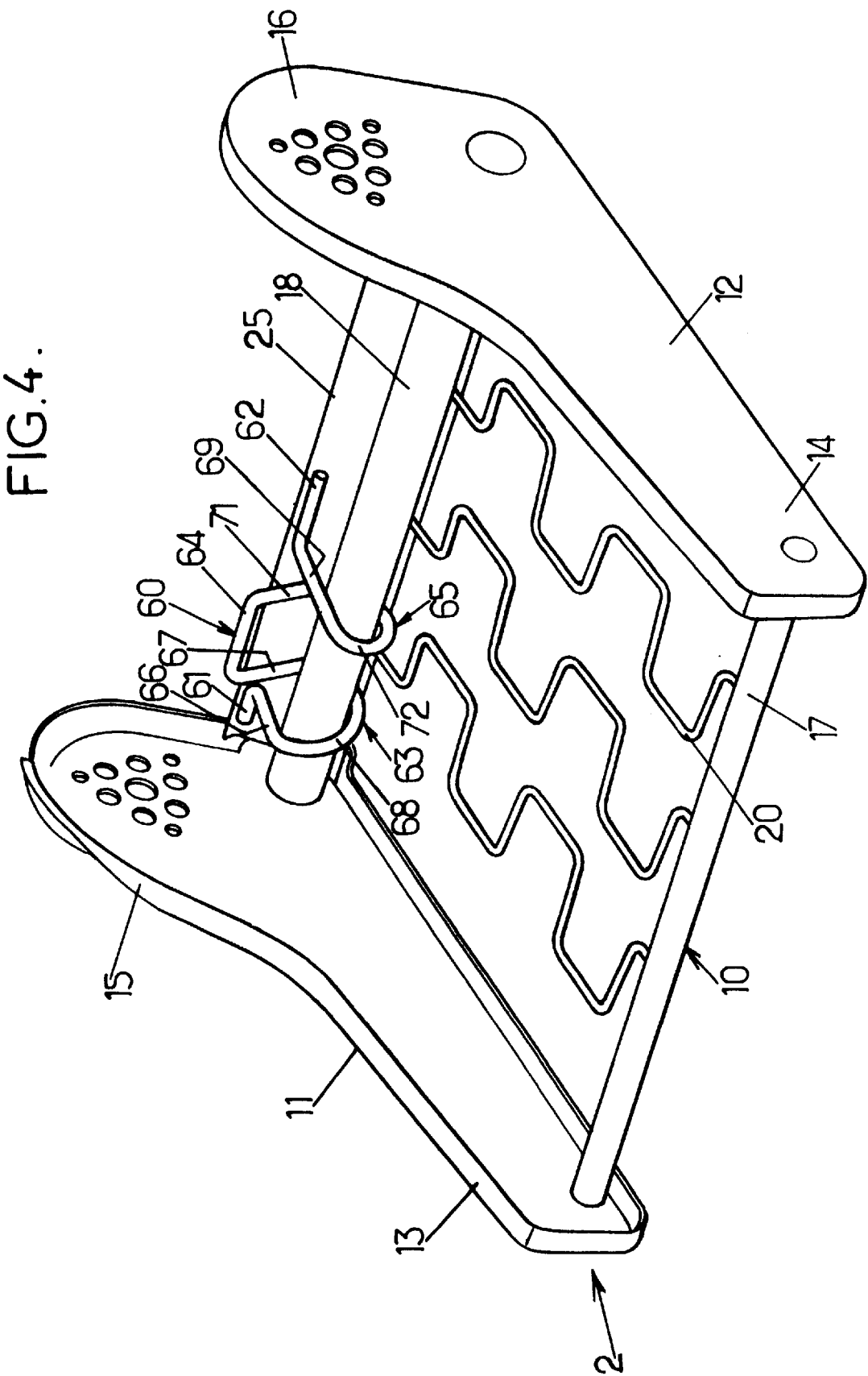

The third embodiment of the anchoring wire 60 illustrated in FIG. 4 differs from the second embodiment illustrated in FIG. 3 only by the fact that the first legs of the open loops pass outside of the "U" shape. Consequently, the anchoring wire 60 has two ends 61, 62, between which two open loops 63, 65 extend, each having a first leg 66, 69 joined to the ends 61, 62 of the curved sections 68, 72 and a second leg 67, 71 joined to the fixing section 64. The first ends 61 and 62 as well as the fixing section 64 are again straight and arranged transversely and the section 64 is located on a higher level than said ends.

The second legs 67, 71 of the two loops 63, 65 form a "U" shape in conjunction with the fixing section 64. The two ends 61, 62 are welded to the flap 25 so that the "U" shape is substantially vertical whilst the first legs 66, 69 of the two open loops are located outside this "U" shape.

In the event of impact, the forces exerted on the fixing section 64 are transmitted to the tube 18 as the two loops 63, 65 contract in the manner described above.

Figure 5:
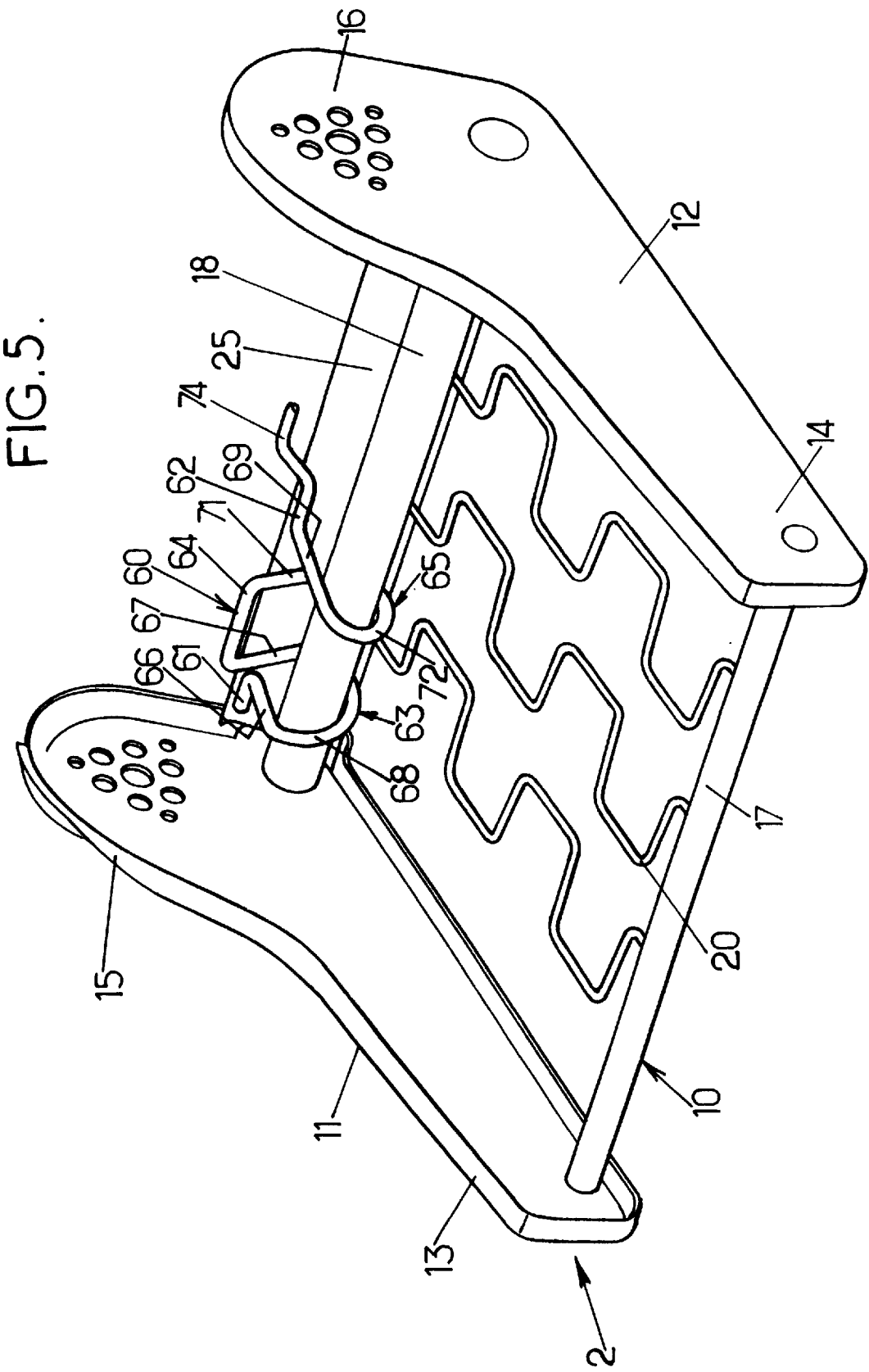

The fourth embodiment illustrated in FIG. 5 differs from the third embodiment illustrated in FIG. 4 only due to the fact that the two anchoring wires 60, each of which is identical to the anchoring wire 60 described above, are reciprocally joined by their ends 62 directed towards the interior of the seat 1. These two ends are cast from a material together with another fixing section 74 which extends parallel with the tube 18 and which allows the child seat to be anchored at a third point (only one of the two anchoring wires 60 is illustrated and only a part of the fixing section 74 is shown). The two ends 62 are also welded to the flap 25. In the event of impact, the traction exerted by the child seat on the three fixing sections 64, 74 causes the four loops 63, 65 to contract around the tube 18 so that the forces are transmitted to this tube.

In each of the four embodiments described above, the adult seat may also have a collar. In this case, the transverse tube 18 is mounted so that it can rotate relative to the two side flanges 11, 12.

This being the case, as the loops of the wires contract around the transverse tube 18 to transmit the forces, they also assist the locking action of the collar by braking the rotation of this tube 18.

We claim:

1. A seat for a motor vehicle comprising a seat proper and a backrest mounted above the seat proper, the seat proper having a seating structure which comprises:
    two side flanges, each having a front part, arranged at a distance from the backrest and a rear part close to the backrest, and
    at least one transverse tube joining the rear parts of the side flanges,
    wherein the seat also has at least one anchoring wire designed to secure an element to be placed on the seat, where it is retained, the wire essentially being rigid and comprising a first and a second end extending between a fist loop and a fixing section, said first loop disposed around said transverse tube and, said fixing section adapted for fixing said element, said fixing section being located between said first loop and said second end of the anchoring wire,
    wherein the first and second ends of the anchoring wire are joined to the seating structure so as to remain immobile relative to the transverse tube,
    and wherein the anchoring wire is adapted to be deformed, under the action of a force exerted by the element on the fixing section of the anchoring wire, for causing the first loop to contract around the tube and transmit the force to the tube.

2. The seat for a motor vehicle as claimed in claim 1, in which said first loop has a diameter larger than the diameter of the transverse tube.

3. The seat for a motor vehicle as claimed in claim 1, in which the first and second ends of the wire extend in opposite directions, each said end towards said respective side flange.

4. The seat for a motor vehicle as claimed in claim 1, in which the fixing section extends parallel with the transverse tube.

5. The seat for a motor vehicle as claimed in claim 1, in which said first loop comprises first and second straight legs which are mutually perpendicular and joined to one another by a curved section substantially arcuate, the first leg being integral with the first end of the anchoring wire and the second leg being integral with the fixing section.

6. The seat for a motor vehicle as claimed in claim 5, in which a crossmember, adjacent to the transverse tube extends transversely between the side flanges, the first and second ends of the anchoring wire being joined to said crossmember, substantially perpendicularly to a plane formed by said first loop.

7. The seat for a motor vehicle as claimed in claim 5, in which the anchoring wire has a second loop passing around the transverse tube and having first and second legs joined respectively to the second end of the anchoring wire and the fixing section, the second legs of the first and second loops forming a "U" shape in conjunction with the fixing section.

8. The seat for a motor vehicle as claimed in claim 7, in which the first legs of the first and second loops are arranged inside the "U" shape.

9. The seat for a motor vehicle as claimed in claim 7, in which the first legs of the first and second loops are arranged outside the "U" shape.

10. The seat for a motor vehicle as claimed in claim 9, in which two anchoring wires are reciprocally joined to one another.

11. The seat for a motor vehicle as claimed in claim 1, in which two anchoring wires are located on the rear transverse tube.

12. The seat for a motor vehicle as claimed in claim 1, in which the transverse tube is mounted rotatable relative to the two side flanges, and said first loop is adapted for contracting and braking the rotation of the transverse tube, when a sufficiently high force is applied to the fixing section of the anchoring wire.

\* \* \* \* \*